US008509032B2

(12) United States Patent
Rakib

(10) Patent No.: US 8,509,032 B2
(45) Date of Patent: Aug. 13, 2013

(54) VIBRATION MEDIATED NETWORKS FOR PHOTOVOLTAIC ARRAYS

(76) Inventor: Selim Shlomo Rakib, Cupertino, CA (US)

( * ) Notice: Subject to any disclaimer, the term of this patent is extended or adjusted under 35 U.S.C. 154(b) by 520 days.

(21) Appl. No.: 12/634,515

(22) Filed: Dec. 9, 2009

(65) Prior Publication Data

US 2011/0132424 A1    Jun. 9, 2011

(51) Int. Cl.
*H01L 31/042* (2006.01)
(52) U.S. Cl.
USPC ............................................ 367/140; 136/244
(58) Field of Classification Search
USPC .................................. 136/243, 244; 367/140
See application file for complete search history.

(56) References Cited

U.S. PATENT DOCUMENTS

| | | | | |
|---|---|---|---|---|
| 3,914,694 A * | 10/1975 | Shawhan | ........................ | 332/135 |
| 6,545,211 B1 * | 4/2003 | Mimura | ......................... | 136/244 |
| 7,561,492 B2 * | 7/2009 | Willins et al. | .................. | 367/124 |
| 2004/0211456 A1 * | 10/2004 | Brown et al. | .................. | 136/243 |
| 2010/0224227 A1 * | 9/2010 | Lindsey | ......................... | 136/244 |
| 2010/0282293 A1 * | 11/2010 | Meyer et al. | ................... | 136/244 |
| 2011/0005567 A1 * | 1/2011 | Vandersluis et al. | ........... | 136/244 |

* cited by examiner

*Primary Examiner* — Ian Lobo
(74) *Attorney, Agent, or Firm* — Stephen E. Zweig

(57) ABSTRACT

A system and method to optimize the overall power output of a photovoltaic solar array. The solar panels are connected to software adjustable power optimizing devices, which in turn are connected to a mesh network with individual router devices. The individual router devices will send and receive data packets by creating or detecting vibrations in a solid vibration conducting media (such as the solar power wiring) that connects the individual photovoltaic solar panels. Often at least one centralized control device is used to periodically request sensor data packets from the individual router devices and solar panels. The centralized control device will typically compute the proper adjustments for the individual adjustable power optimizing devices that will optimize the overall power output from the photovoltaic solar array. The control device will then send adjustment data packets back to the individual router devices through the mesh network, thus optimizing overall power output.

7 Claims, 9 Drawing Sheets

Solar Panel Current & Voltage versus Irradiance and Temperature

Figure 9
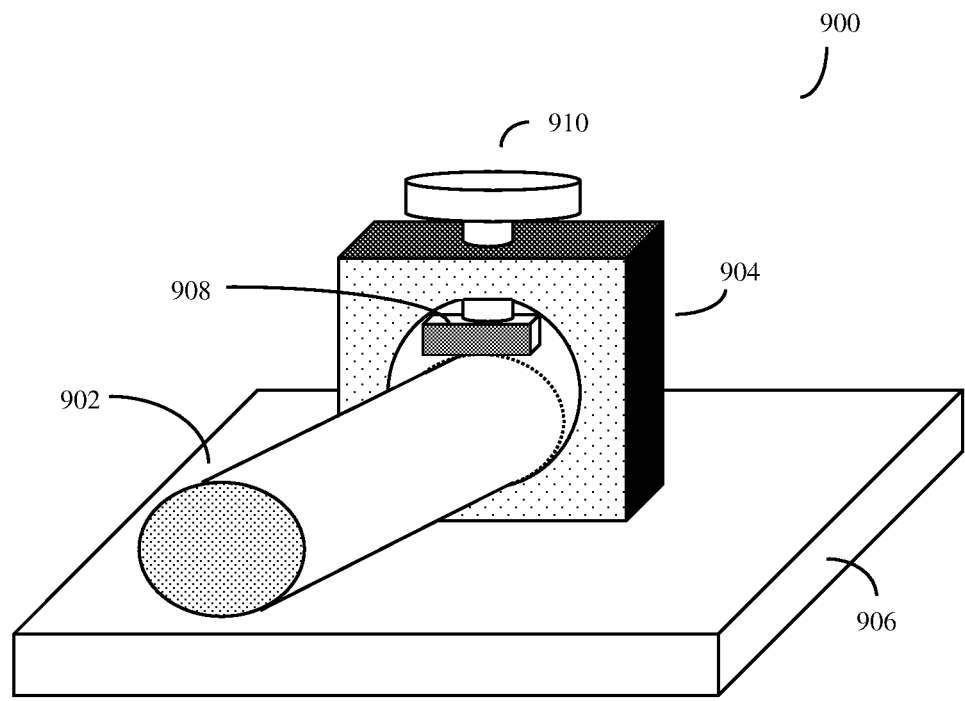
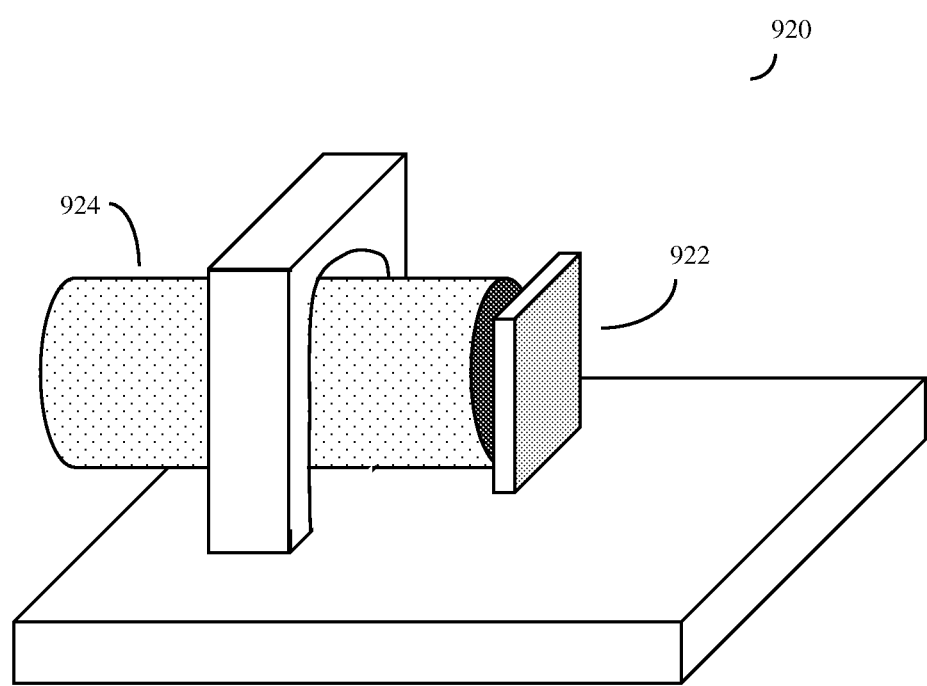

VIBRATION MEDIATED NETWORKS FOR PHOTOVOLTAIC ARRAYS

BACKGROUND OF THE INVENTION

As the costs of production of photovoltaic solar cells (also called photovoltaic panels, photovoltaic cells, solar photovoltaics, photovoltaics, PVs, solar cells and solar panels) have decreased, and as the costs for fossil fuel energy have increased, photovoltaic panels, and arrays of photovoltaic panels, have become an increasingly cost competitive method for generating electricity. Indeed, photovoltaic arrays are now one of the world's fastest growing sources of alternative energy. Thus methods of optimizing electrical energy produced by photovoltaic arrays are of large economic interest.

Photovoltaic solar cells normally operate by a process in which photons from sunlight interact with a solid state photovoltaic material, normally some sort of photodiode, and knock the electrons into a higher energy state. These electrons are then collected, and produce a DC electrical current that can be harnessed to do useful work. By combining a large number of individual photovoltaic solar cell panels into series and parallel circuits, these arrays can produce a substantial amount of DC electrical power, on the order of megawatts and more.

Since most electrical appliances are configured to use AC current at a fixed voltage, such as 115 or 230 volts, the DC electrical output from photovoltaic arrays is usually converted to an AC power output, often using an inverter. Typically inverters can adapt to a range of input DC voltages and currents, and produce AC power (at varying current levels) at a constant AC voltage. Although inverters convert DC energy to AC energy at a high efficiency, due to conservation of energy principles, the AC output power of an inverter will, of course, never exceed the DC input power to the inverter.

Photovoltaic cells work at their highest efficiency when they are pointed directly at the sun. As the amount of incident sunlight onto the photovoltaic cell becomes less favorable, the amount of solar energy or "irradiance" per square meter of the photovoltaic cell drops, and the number of photons knocking electrons to a higher energy state also drops. Although each photon will itself still have the same amount of energy, due to the lower amount of light, the number of energized electrons will drop, and thus the electrical current produced by the photovoltaic solar cell will also drop.

Many things can contribute to diminished solar irradiance. Due to the angle of the sun in the sky, the angle of the sun relative to the solar panel will generally be less favorable during the early morning and late afternoon. Clouds, shadows, and dirt on the solar panels can also contribute to diminished solar irradiance.

Each solar panel will operate at a maximum power output when subjected to the appropriate electrical load. Due to the internal resistance of the solar panel, and other factors, the electrical load that produces a maximum solar panel power output is not a constant load, but rather varies according to both the amount of current output by the solar panel, and the temperature that the solar panel is operating at.

Prior art solar power optimization circuits, exemplified by Chetty, U.S. Pat. No. 4,604,567, and Watkinson, U.S. Pat. No. 5,001,415; disclosed methods to optimize solar panel output power under varying conditions by briefly sampling the open circuit voltage of the solar panel array, and then varying the load on the solar panel (Chetty), or alternatively using a switching power converter to maximize power output (Watkinson). These power optimization units go by a number of different names, including variable load adjusters, power optimizer circuits, maximum power point tracker devices, and MPPT devices.

Although such prior art circuits can help improve the efficiency of individual solar panels and smaller solar panel arrays, the complexity of the problem as the size (e.g. number of individual panels) of the solar panel array increases should be appreciated.

Due to the nature of series and parallel electrical circuits, the maximum current through a series circuit is always limited by the maximum current that passes through the series circuit's weakest (highest resistance) link. Indeed if one element in a series circuit breaks, the whole circuit goes down. By contrast, due to the nature of parallel electrical circuits, the maximum current produced by a parallel circuit limited by the current generating capacity of the individual parallel circuit members.

Thus in a larger array of solar panels, even if the individual panels in the array are each equipped with prior art power optimization circuits, the array as a whole may still operate at suboptimal efficiency. For example, if one portion of the overall array is shadowed or obscured, the power optimization circuits controlling the obscured portion of the array may appropriately place a higher load on those solar panels, producing a correct local power optimization, but producing a suboptimal overall power optimization since these obscured panels may be connected in series or parallel circuits with other non obscured panels, and thus interfere with the power generation of the larger array as a whole.

Thus methods to enhance coordination between individual power optimization units and optimize overall array power production are of high commercial interest.

BRIEF DESCRIPTION OF THE INVENTION

Here, an inexpensive and robust networking method that allows the local power optimization units (i.e. the variable load adjusters, power optimizer circuits, maximum power point tracker devices, and MPPT devices) of a solar panel array to better coordinate their individual and local power optimization efforts in order to optimize power output of the solar array as a whole is described.

Arrays of photovoltaic solar panels pose a relatively unique set of networking problems. Such arrays generally consist of a large number of individual photovoltaic solar panels, each panel often having a surface area of a square meter or more, placed in close proximity with other panels of the same type. Such arrays may be disposed in remote areas, but often may also be disposed on top of buildings in urban areas, where considerations such as radiofrequency noise and electrical noise, which can often interfere with network communications, can become an issue. At the same time, electrical safety codes, such as the US National Electrical Code (NEC) Article 690 (2008), place many constraints on the types of wiring and interconnects that can be used by photovoltaic solar arrays.

In order to overcome these electrical issues, and to take advantage of some of the unique aspects of the topology of arrays of solar panels, a non-intuitive networking modality, based upon vibrations in a solid medium, such as the electrical cables or support structures that form the backbone of arrays of photovoltaic solar panels, is disclosed Devices, such as mesh-networked local photovoltaic solar panel power-optimizers, and centralized controllers that can send and receive information over the vibration mediated network are also disclosed. The resulting system is capable of achieving a superior global optimization of overall photovoltaic solar array power output, while at the same time avoiding problems of electrical and radio interference, safety, and cost issues that are associated with prior art networking methods.

BRIEF DESCRIPTION OF THE DRAWINGS

FIG. 9 shows a diagram of various alternate transducer configurations.

DETAILED DESCRIPTION OF THE INVENTION

Figure 1:
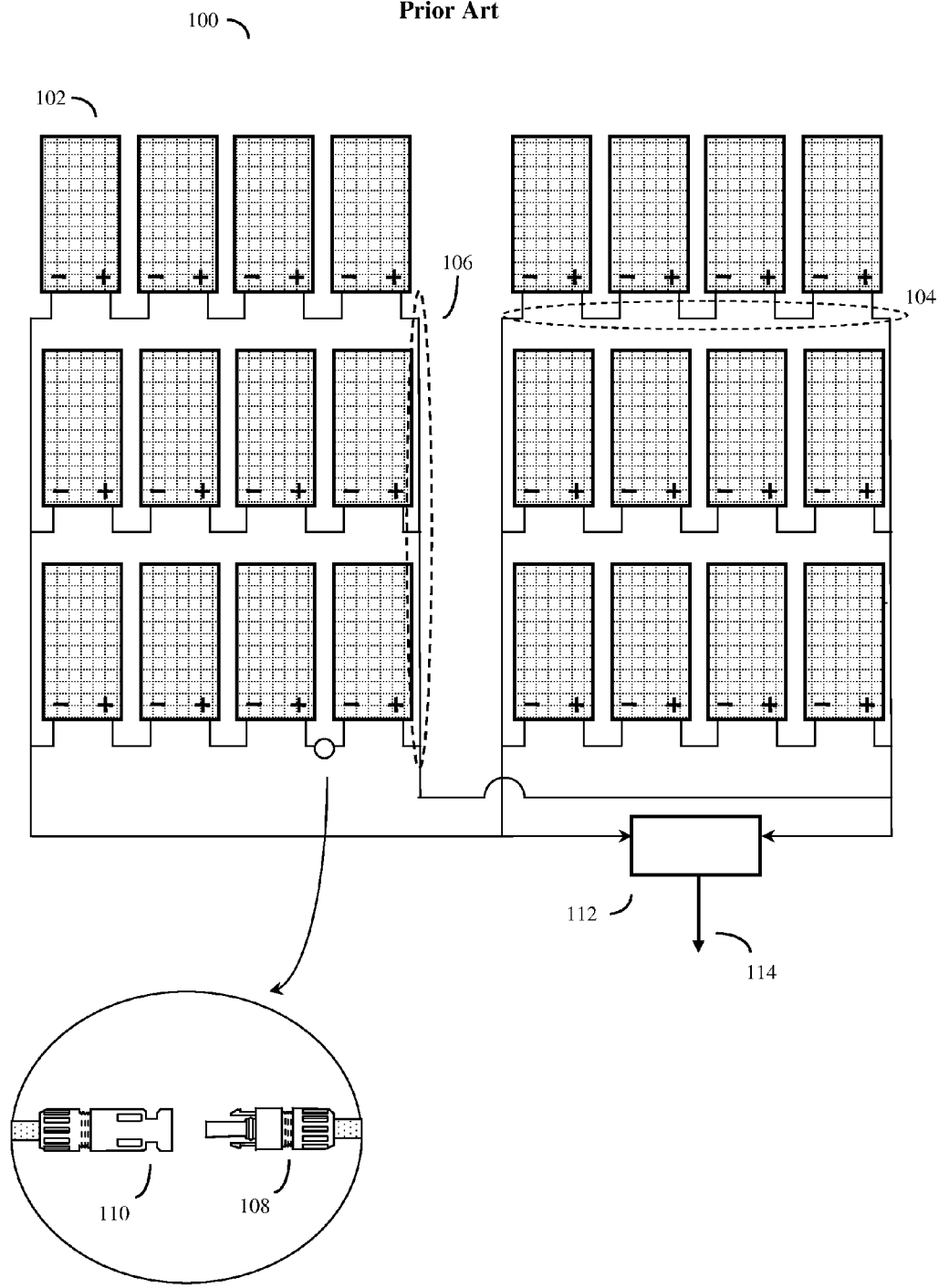
FIG. 1 shows a diagram of a prior art "dumb" array of photovoltaic solar cells (panels).

One of the most unusual aspects of the invention is its use of vibrations in a solid medium as the primary basis for communicating information and forming a network, in particular a meshed multi-node network.

As previously discussed, although the use of vibrations in a solid media as a communications modality is non-intuitive for this application, this type of communications modality does appear to be well suited to photovoltaic solar panel arrays. Solar panels in such arrays are typically mounted very close together, with typical spacing between panels on the order of one meter or less. Such panels are usually mounted on rigid support structures, and connected by relatively thick, robust, and semi-rigid power cables that lend themselves well to conducting vibrations for fairly long distances.

This approach also avoids the problem that, as previously discussed, a number of photovoltaic solar panel wiring codes make it more difficult to implement more traditional networking approaches, such as by installing supplemental wiring alongside of the main solar panel wiring. The unorthodox vibration mediated approach of the invention also helps overcome problems caused by electrical noise and radiofrequency noise. Finally, from a security standpoint, some organizations may not wish to risk sharing the knowledge of their solar panel tuning and optimization strategy with the world, which would essentially be the case if alternate prior art wireless networking methods were used. The vibration data transmission approach minimizes this problem as well.

The vibrations in the solid media may be induced by a variety of methods. In general, electrically driven transducers, such as piezoelectric or magnetic transducers, may be used. These transducers will normally drive the sold media at frequencies in the audio i.e. 20-20,000 KHz range, or ultrasonic range (over 20,000 KHz). Here the optimal frequency will vary from media to media, and indeed ideally upon first use, an optimization process may be done to determine what frequencies are best for any given situation. Here an auto tuning and calibration scheme to enable better vibration or acoustic coupling may be useful. Additionally, standard methods to estimate the response of the solid media vibration channel, including predistortion, equalization, and echo cancelation techniques, may also be used to improve the communication performance of the system.

Data may be communicated by a variety of different schemes, including continuous and burst communication schemes. In one embodiment, data may be communicated by frequency modulation. In a digital frequency modulation scheme, the transducer can transmit a first vibration frequency as a digital "1", and a second vibration frequency as a digital "0". The data transmission schemes may further be full-duplex or half-duplex. In this disclosure, to keep the examples simple and easy to follow, most of the examples will use a simple, half-duplex, binary "0" and "1" frequency modulation scheme; however these examples are not intended to limit the scope of the invention in any way.

More complex multi-value schemes may also be used that can transmit more than one bit at a time. Examples of such multi-value schemes include dual-tone multifrequency schemes (similar to that used in telephone handsets), exemplified by protocols such as such as the International Telecommunications Union recommendation Q.23 protocol.

Other data transmission schemes include the Bell labs and CCITT modem protocols. For example, the Bell 103 protocol can transmit at a 300 baud per second rate using 1-bit bauds (changes in the transmitted level per second). Depending upon the solid medium chosen, much higher data transmission rates may be possible. Custom data transmission schemes may also be devised. Standard error correction schemes, such as the v.42 error correction protocol, checksum protocols, parity bits, cyclic redundancy checks (CRC), hash functions or other protocols may be used, as well as custom error detection and correction protocols. Although one advantage of using vibrations in solid media is that unlike wireless communications (which are easy to intercept), vibrations in sold media are generally harder to intercept; if necessary for still higher security, encryption may also be used.

Vibrations in the solid media may be detected and transformed to electrical signals by a wide variety of transducer methods as well, including accelerometers, piezoelectric sensors, microphones, and magnetic pickups.

In some embodiments, the same transducer device may act as both a vibration inducer and a vibration sensor. Such dual purpose devices include piezoelectric transducers, magnetic transducers, and the like.

Although the vibration mediated communication channel may be used for many applications, as previously discussed, in a preferred embodiment, the vibration mediated communications channel is used to help optimize the setting of a plurality of different solar power optimization circuits, which in turn are connected to a plurality of different photovoltaic solar panels, connected in an array. Usually the wiring of such an array will allow each solar panel to be connected to at least two neighbors (for example, solar panels in the middle of a series circuit of solar panels are connected to neighbors on both the right and left.). Quite often however, the solar panels will also be connected to three neighbors (for example, solar panels located at the ends of a series circuit, and interfacing with other solar panels through a parallel circuit, thus talking to their neighboring series neighbor, and the neighbor in the parallel circuit above, and the neighbor in the parallel circuit below).

No networks are perfect. All equipment occasionally breaks, and indeed solar panels, being highly marketable, are often subject to outright theft as well. To avoid having the breakdown of a single solar panel (or it's associated networked power optimization circuit) cut off a larger section of the photovoltaic solar array from communication, it will often be desirable to design the communications system as a mesh network in which each vibration mediated communication node is capable of functioning as an independent router. This way, in the event of communications breakdown, the various nodes can find alternate communications paths and send messages around the problem area.

In this specification, for simplicity, it will be assumed that each solar panel has its own independent vibration mediated communications device attached to it. As will be discussed, often this vibration mediated communications device will be a part of, and will control, a power optimization circuit for that particular solar panel. For brevity, in some cases the specification will speak of communication between solar panels, and here it should be understood that this is a shorthand way of talking about vibration mediated communications between communications devices attached to the solar panels.

In one embodiment, the invention is a data communications device for a photovoltaic solar panel, comprising at least one electrically driven vibration transducer capable of inducing vibrations in a solid media. Here the electrically driven vibration transducer is a component of an electrical circuit that is in electrical contact with the photovoltaic solar panel, and the solid media is selected to be capable of transmitting the vibrations to an external vibration receiver, thus using the vibrations to communicate data.

In another embodiment, the invention is a data communications device for at least one photovoltaic solar panel, comprising at least one electrically driven vibration transducer capable of inducing vibrations in a solid media and at least one vibration receiver capable of detecting vibrations in the solid media, and converting these vibrations into an electrical signal. Further, the electrically driven vibration transducer and the vibration receiver will be components of an electrical circuit that is in electrical contact with the photovoltaic solar panel, and the solid media will be selected for being capable of transmitting the vibrations to an external vibration receiver, and receiving vibrations from an external vibration transmitter, and again these vibrations are used to both transmit and receive data.

In another embodiment, the invention is a vibration mediated data communications device for at least one photovoltaic solar panel, comprising: at least one electrically driven vibration transducer capable of inducing vibrations in a solid media, and at least one vibration receiver capable of detecting vibrations in the solid media and converting the vibrations back into a received electrical signal. As before, the solid media is selected for being capable of transmitting the vibrations to an external vibration receiver, and receiving vibrations from an external vibration transmitter. Further, the electrically driven vibration transducer and the vibration receiver will be components of an electrical circuit that is in electrical contact with the photovoltaic solar panel. This electrical circuit will typically additionally comprise: a device identification number (often stored in memory); a router; at last one processor in electrical communication with the electrically driven vibration transducer and the vibration receiver; software stored in memory that is addressed by the at least one processor; sensors capable of detecting at least the voltage level and the current level produced by the photovoltaic solar panel and relaying the voltage level and said current level to the at least one processor; and at least one processor-controlled variable-load adjuster (power optimization circuit, MPPT device) capable of placing a variable load on the photovoltaic solar panel, or otherwise altering the voltage and current output by the photovoltaic solar panel upon command by the processor. In this embodiment, the vibrations are used to both transmit and receive data packets comprising at least an ultimate destination device identifier, a local destination device identifier and payload data. This device may package the voltage level and current level produced by the photovoltaic solar panel into a sensor payload data portion of a sensor data packet, and transmit this sensor data packet to an ultimate destination device identifier by way of a local destination device identifier. Alternatively, the device may receive an adjustment data packet, and if the local destination device identifier and the ultimate destination identifier on the adjustment data packet corresponds to the device identification number, the device may use the adjustment data packet payload on the received adjustment data packet to direct the processor-controlled variable-load adjuster (power optimization circuit) to alter the current and voltage output of said photovoltaic solar panel. As another alternative, the device may receive a routed data packet, and if the local destination device identifier on the routed data packet corresponds to the device's identification number and the ultimate destination device identifier on the routed data packet does not correspond to the device identification number, then the device will route the routed data packet to a second local destination device identifier suitable for transmitting the received (routed) data packet payload data to the ultimate destination device identifier on the routed data packet.

In yet another embodiment, the invention is a method to optimize the overall power output of a photovoltaic solar array comprised of a plurality of individual photovoltaic solar panels. The method comprises connecting the individual solar panels in the array to a mesh network with individual router devices assigned to each solar panel, where the individual router devices further comprise sensors capable of monitoring the voltages and the currents of the individual solar panels and sending out sensor data packets containing the voltage and said current information. These individual router devices will further comprise software-adjustable, power level optimizer (variable-load) devices capable of altering the voltage and current output by the individual solar cells upon command by adjustment data packets. Here the individual router devices will be further equipped with a mesh routing capability to route data packets between other individual router devices assigned to each solar panel in the array. Further, the individual router devices will send and receive data packets by creating or detecting vibrations in a solid vibration conducting media (such as the solar power wiring) that connects the individual photovoltaic solar panels. This method will use at least one centralized control device to periodically request sensor data packets from the individual router devices connected to the individual solar panels. The centralized control device will typically compute the proper adjustments for the individual router device's software-adjustable variable-load devices (power output optimizer devices) that would optimize the overall power output from the photovoltaic solar array. The centralized control device will then send adjustment data packets back to the individual router devices assigned to each individual solar panel, thus optimizing overall power output.

Further Discussion:

FIG. 1 shows a prior art array of solar panels (100), composed of individual solar panels (102) wired in both series (104) and parallel (106). For solar arrays constructed after 2008, the National Electric Code (NEC) Article 690 regulation requires that solar panel wiring use rigid or semi-rigid connectors that snap together and then lock. One example of an approved type of connector is the MC4 multicontact connector. The insert shows an example of a Male MC4 connector (108) and a Female MC4 connector (110). Typically each solar panel (102) may have its own set of positive and negative connectors, and the solar array (100) may contain many individual snap interlocking cables. Typically the output of a simple solar array will be converted by an inverter (112) that takes the varying DC voltage and current produced by the solar array, and produces AC power at a fixed voltage, such as 115 volts (114).

As previously discussed, one of the reasons why a solar array communications system is needed in the first place is to globally optimize the settings of a plurality of power optimization circuits which will be placed throughout the array, often on a one per solar panel basis, to locally optimize electrical power production over a broad range of incident sunlight and temperature conditions. In order to better appreciate the impact of varying sunlight, clouds, dirt, temperature and time of day on the voltage and current output of a typical solar cell in the absence of such a power optimization circuit, please refer to FIG. 2.

Figure 2:
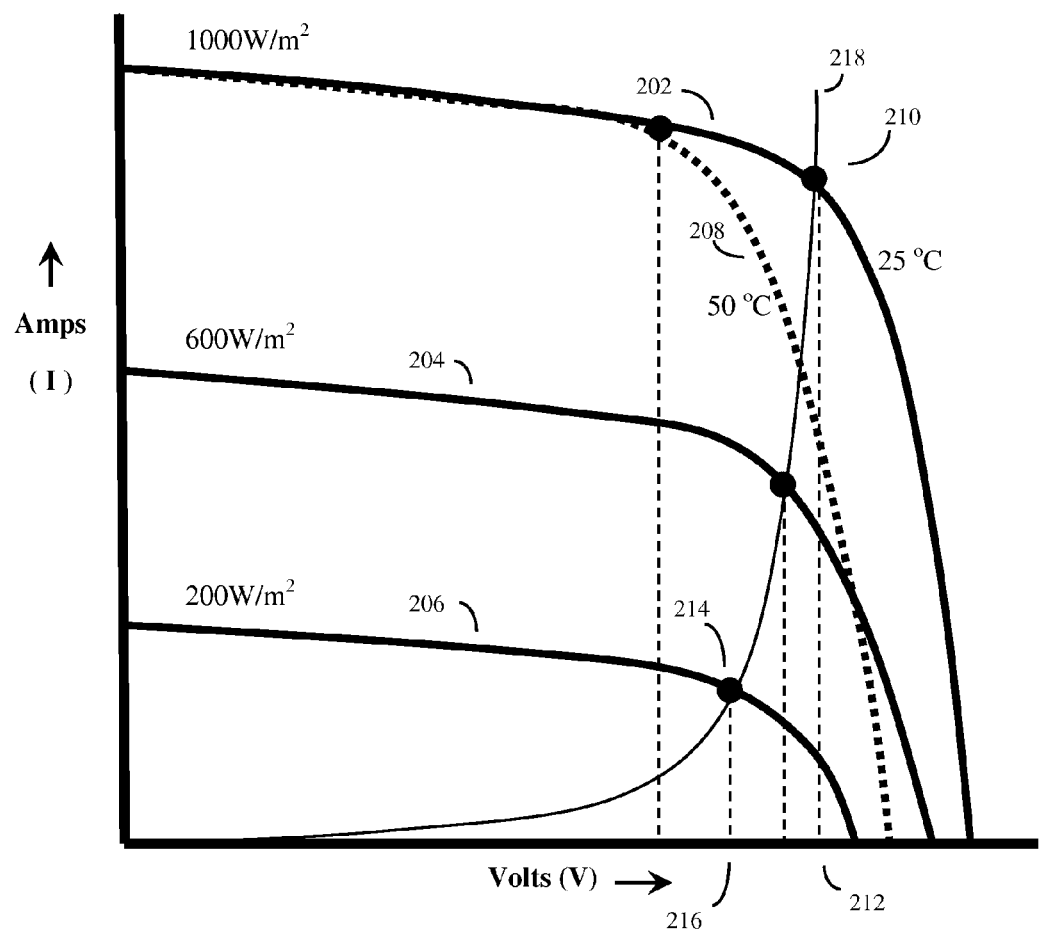
FIG. 2 shows a graph of the points of maximum power output for a typical photovoltaic solar panel over a range of different solar irradiance levels and temperatures.

FIG. 2 shows that the output voltage and current of a photovoltaic solar panel (or solar cell) varies as a function of both incident light (irradiance) and temperature. The general rule is that larger amounts of light produce a larger amount of current (measured in Amps), and that photovoltaic cells operate with greater efficiency at lower temperatures. As the load on the solar panel increases, the current that the panel produces drops. Thus a solar panel produces a characteristic "knee" shaped curve of Amps versus Volts at various load levels, various Irradiance levels, and various temperatures. The curves for solar panels operating at a near ideal 25° C. operating temperature are shown as (202) (for a robust sunlight source around noon, impinging directly on the panel, this will be about 1000 Watts per meter$^2$ solar panel area), (204) (for less robust sunlight either striking the panel at a less ideal angle, or with partial clouds, and (206), (for relatively weak sunlight nearer to dawn or dusk, or more extreme overcast). By contrast, the curve for a solar panel operating under a still ideal 1000 Watts per meter$^2$, but at the higher temperature of 50° C., is shown as (208).

The total power output by a solar panel is the product of current (I) times voltage (V). As a result, the power output will generally be best if the load or load equivalent placed on the solar panel is such as to place its Current (I) (measured in Amps) and Voltage right near the beginning of the inflection point of the knee. Thus at 25° C. and an incident light of 1000 W/meter$^2$, the optimal power point will be (210), and thus the load on the solar panel should be adjusted so as to produce voltage (212). By contrast, at 25° C. and an incident light of only 200 W/meter$^2$, to optimize power output (214), the load on the solar panel should be considerably reduced so as to produce a lower output voltage (216). The point of maximum power output versus Irradiance at any given temperature thus has a characteristic curve (218). Thus in contrast to the "dumb" fixed load solar array previously shown in FIG. 1, a "smart" variable load solar array can produce on average between 20-30% more power on a daily basis.

As a result, more advanced prior-art photovoltaic solar panel arrays employ a plurality of power optimization circuits, which will often be referred to here in the alternative as variable load adjusters, power optimizer circuits, maximum power point tracker devices, and MPPT devices. For simplicity, these will be assumed here to be deployed here on a one per solar panel basis, although other deployment schemes are also possible. As previously discussed, these power optimization circuits do a good job of optimizing the power output of the local regions of the solar array that they are attached to, but fail to take into account global (i.e. entire array) power optimization issues. An example of a more sophisticated prior art photovoltaic solar panel array, employing a plurality of such power optimization circuits, is shown in FIG. 3.

Figure 3:
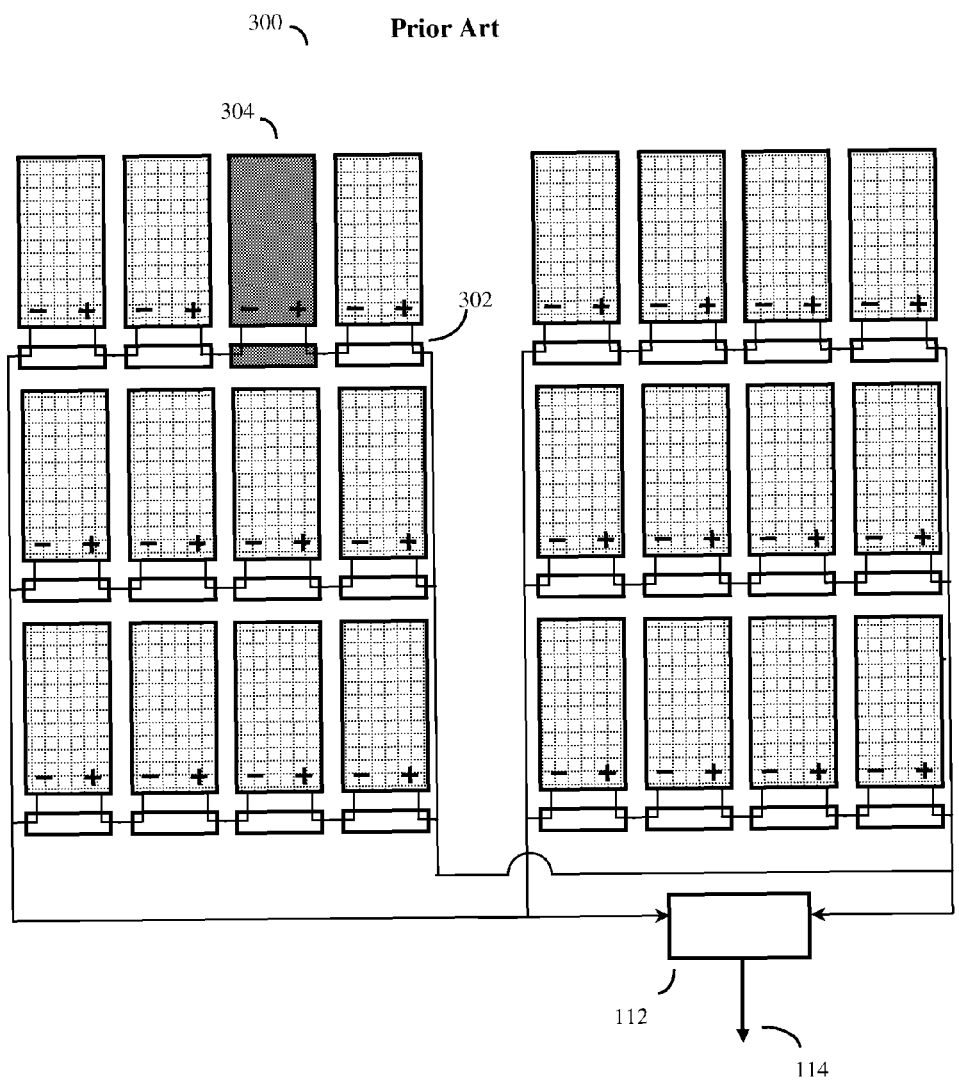
FIG. 3 shows a diagram of a prior art (unnetworked) array of photovoltaic solar cells (panels) equipped with an array of non-networked power optimization devices.

FIG. 3 shows a more sophisticated prior art solar panel array (300), in which power optimization devices, also referred to as maximum power point tracker devices, (MPPT devices) (302) are now installed for each panel. These power optimization circuits (MPPT devices), which can operate by various principles, essentially act to optimize the output power for each solar panel in the array. Although this is an improvement over the dumb solar array of FIG. 1, this is still not ideal. If solar panels on part of the array (304) become shaded, covered with dirt, or otherwise damaged, the MPPT device controlling that panel will adjust the load on that solar panel, potentially throwing the neighboring solar panels off of their optimum loads (because the affected solar panel will influence the voltage and current of neighboring solar panels that are wired in series or parallel with the affected solar panel), and adversely impact the power efficiency of the array as a whole. To avoid this problem, the settings of the MPPT devices throughout the array should ideally be coordinated and adjusted to produce an overall maximum output power under the widest possible conditions.

Figure 4:
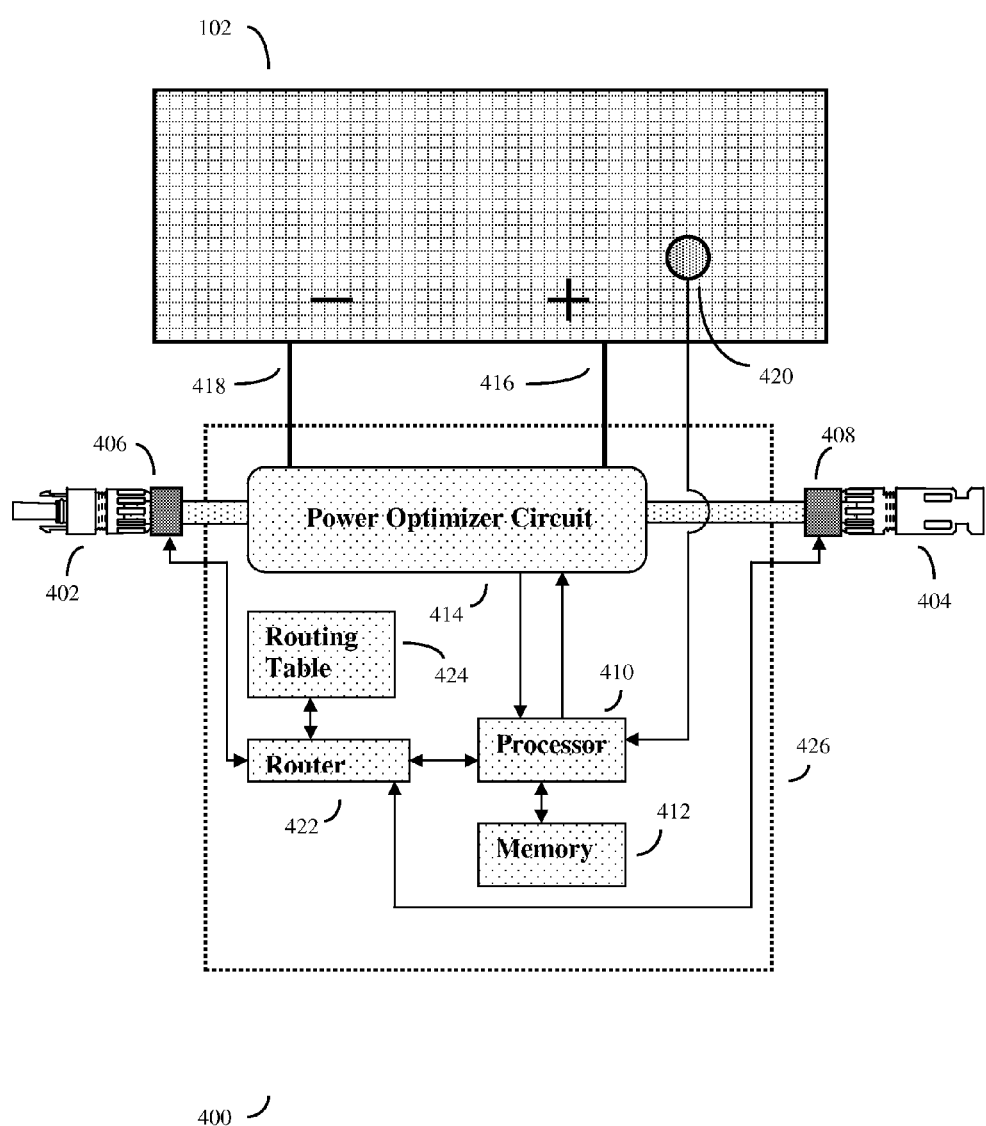
FIG. 4 shows a diagram of a networked photovoltaic solar cell power optimization device that utilizes vibrations in a solid medium to communicate with similar devices and/or a centralized controller device.

FIG. 4 shows one embodiment of a combination data communications device and a centrally controlled power optimization circuit (MPPT) setting device (400) for a photovoltaic solar panel (102). In some cases, this device will be referred to as a networking "node". In this embodiment, the device is capable of communicating with peer devices (connected to neighboring solar panels) and with a centralized control device by way of vibrations in a solid medium. Here the solid medium is the male and female NEC Article 690 compliant solar power cables, and optional snap connectors. The device (400) will normally be wired into the solar array on a one per solar panel basis, similar to the non-networked MPPT setting devices (302) previously shown in FIG. 3. The device (400) will thus operate as a node in a multi-element mesh network, and communicate by sending signals through the network. For these purposes, FIG. 4 can be regarded as an improved and networked version of the prior art power optimization circuit (MPPT setting device) (302), and unless otherwise stated, the wiring of the network will generally follow the power wiring diagram previously shown in FIG. 3.

In this embodiment, each solar power cable (402), (404) is equipped with an electrically operated transducer (406), (408), shown here in a ring or tube configuration that encircles or partially encircles the wire, that is capable of generating vibrations in the solid media (solar power cable), and is capable of detecting vibrations in the solid media. The device will usually also have a microprocessor (410), memory for the microprocessor (412), support circuitry (not shown), and a microprocessor-controllable power optimization circuit, such as a MPPT circuit or variable load circuit (414). This circuit (414) will often be referred to as a software-adjustable power optimizer circuit or processor-controlled power optimizer circuit to emphasize that it can be adjusted by various means upon software command to processor (410). This circuit (414) will be connected to the positive and negative electrodes of the solar panel (416), (418) and either send information to the processor stating the current and voltage delivered by the solar array, or alternatively the solar array voltage and current can be provided by other sensors (not shown). The device will also often have one or more thermistor or other temperature sensing devices (420) capable of monitoring the temperature of the solar panel (102) and delivering this information to the microprocessor (410).

The device is designed to function as part of a network, and thus will normally have a router mechanism or functionality (422) and memory containing a routing table (424) of the addresses and network topology of other nodes (devices) in the network. This router functionality (422) may be delivered by separate hardware, or alternatively may be provided by microprocessor (410). The unit will also typically have an electrically accessible identification number, usually unique to each individual device, stored in either memory (412), or routing table (424), or both. Supporting electronic circuitry, such as circuitry to steal power from the solar panel (102) to power microprocessor (412), router (422) and transducers (406), (408) is not shown. Other supporting electronic circuitry, such as circuitry to drive the transducers (406), (408) is also not shown.

Note that in this embodiment, transducers (406) and (408) are shown being located outside of a main device box (426) next to the snap connectors (402), (404). In other embodiments, transducers (406), (408) may be totally or partially inside of the main device box (426) and send vibrations through a longer length of cable to the snap connectors (402), (404). Further, although some embodiments will use snap connectors (402), (404), other embodiments will simply use the solar power wiring without snap connectors (e.g. when different solar panels are directly wired together without use of snap connectors). In general, snap connectors will be shown in the illustrations because this makes certain aspects of the invention easier to visualize, however the use of such snap connectors is not intended to be obligatory or limiting.

A variety of different processors and memory devices may be used for the processor (410), memory (412), router (422) and routing table (424). In some low cost embodiments, the function of both the processor and router may be accomplished by a single controller or microprocessor chip, such as a processor from the popular 8051 series, ARM series, MSP430 series, or other processor family series. The memory (412) and routing table (424) need not necessarily be distinct either. Both may be present as different parts of ROM, Flash memory, RAM, or other memory, which may be shared in common between the router and processor. Normally every device (426) will have its own unique identification code stored in it to give the device a unique address for network purposes, and help distinguish the device from other similar devices. This identification code may be stored in the devices' memory (412) or (424), be uploaded to the devices' memory, or alternatively be supplied by some other electrical circuit or device.

The processor (410), and Router (424) may steal power from the main photovoltaic array (102), be powered by their own small and independent photovoltaic cell (which may be mounted on case (426)), or be powered by other means, such as an independent battery.

Additional support circuitry (not shown) may also be included in device (426). This additional support circuitry may include amplifiers to amply the vibration signal from the transducers, analog to digital converters, filters, digitally controlled oscillators, digital to analog to converters, LCD displays to assist in installation and debugging of the units, switches, and other standard support electronics.

As previously discussed, a variety of different vibration mediated communications schemes may be used to transmit data through the solid media. Here binary frequency modulation methods will be illustrated, because these are easy to draw and easy to visualize. An example of such an embodiment is shown in FIG. 5.

Figure 5:
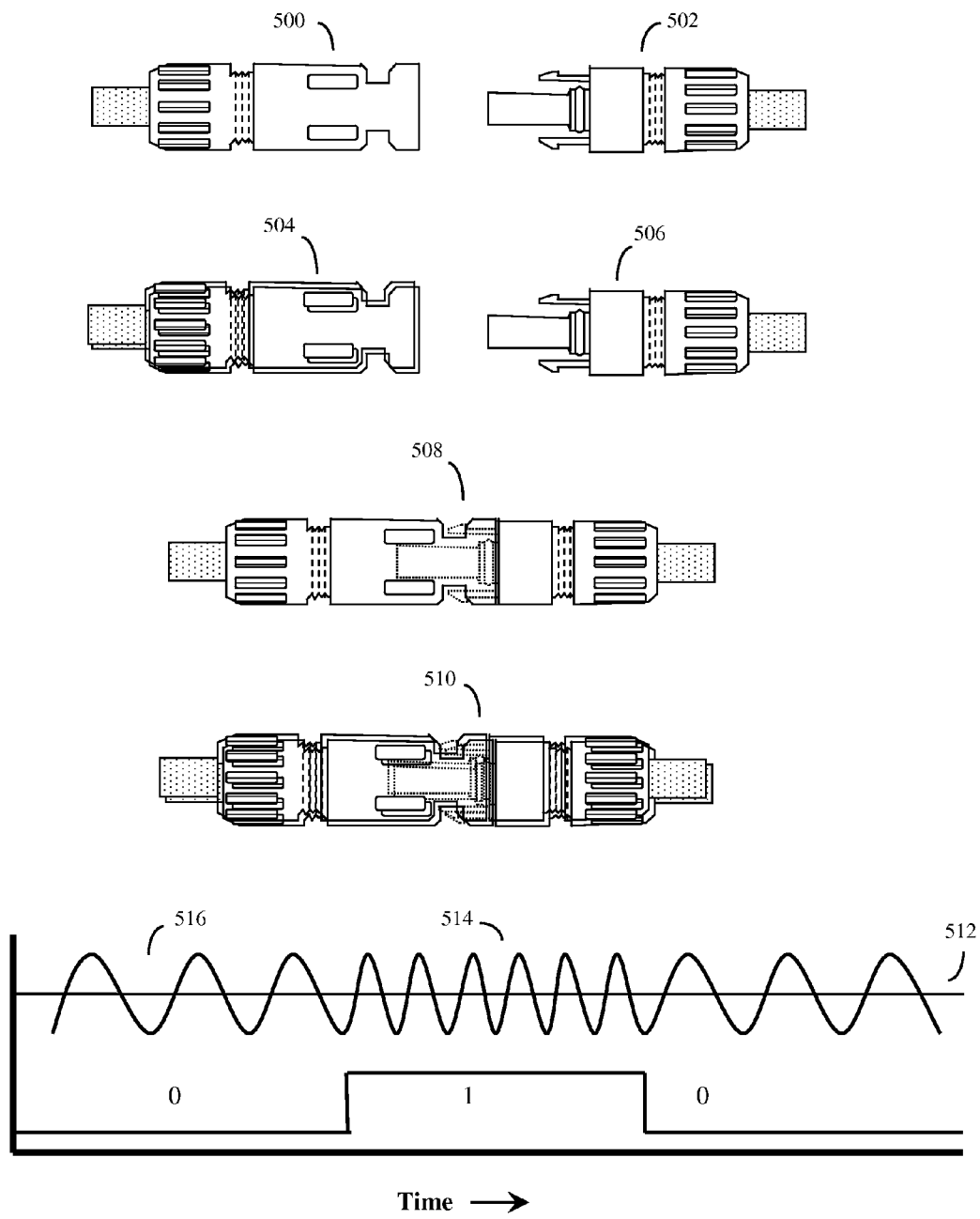
FIG. 5 shows a diagram illustrating how vibrations are conducted through a solid medium comprising a solar array power cable and NEC Article 690 compliant power cable snap connectors.

FIG. 5 shows a diagram of how vibrations may be conducted through the solid medium, again using the solar power cables and snap connectors as an example. Here the transducers are not shown, and should be assumed to be further along the cable and out of sight.

In (500) and (502), neither snap connector is vibrating. In (504), the female snap connector is shown vibrating, but because the male snap connector (506) is not connected, the vibrations are not transmitted further. In (508), the male and female snap connectors are shown connected but not vibrating. In (510), the vibrations previously shown as being transmitted by the female snap connector (504) are now being transmitted to the male snap connector, and thus further along the wire connected to the male snap connector (512).

FIG. 5 also shows an example of one type of vibration mediated data transmission scheme. Here the vibrations are frequency modulated in such a way as to transmit digital pulses (1's and 0's) (512) In this example, a high frequency vibration wave corresponds to a digital "1", (514) and a lower frequency vibration wave corresponds to a digital "0" (516). As previously discussed, many other data transmission schemes may also be used.

As will be discussed in more detail, in a preferred embodiment, the device is configured to operate as a mesh network, in which each device functions as an independent router.

A wide variety of routing methods and data transmission schemes are possible. Here, for purposes of clarity, a particularly simple (bare bones) example is shown in FIG. 6.

Figure 6:
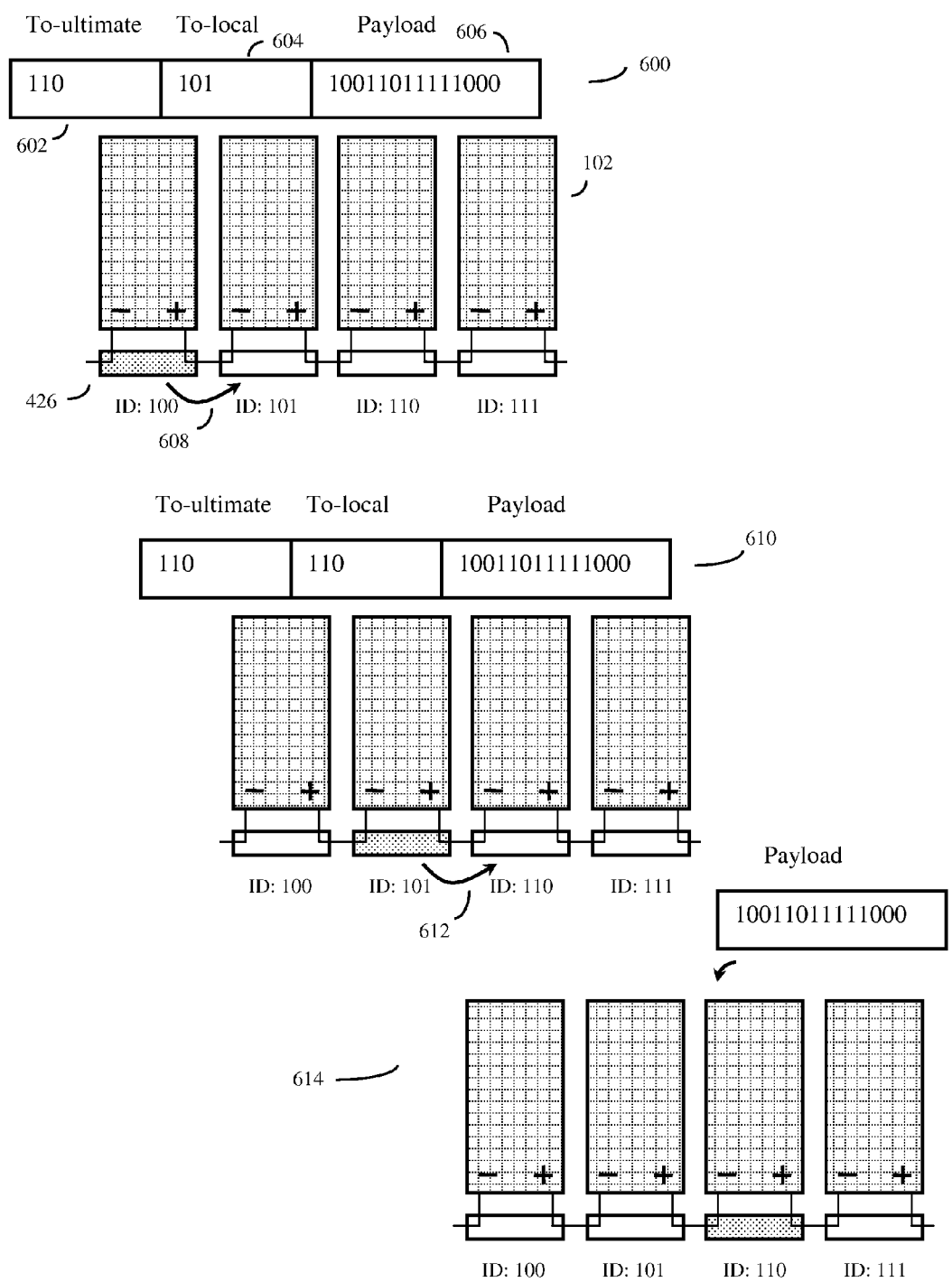
FIG. 6 shows a diagram showing how the vibration mediated network may transmit data packets between individual devices (nodes) in the network.

FIG. 6 shows a simplified example of how the network can transmit a very simple type of data packets. In this example, the simplified data packet (600) consists of a short ultimate device destination address field (602), a local destination device address field (604), and a payload data field (606). The solar panels (102) are connected to a series of devices (426) that were previously shown in FIG. 5.

In the drawing, device (426) with ID (identification number) 100 is sending data packet (600) to device (426) with ID 110. To do this, device (426 ID: 100) consults its routing table, and determines that the best way to send data to device (426 ID: 110) is through device 426 (ID: 101). Device (426 ID: 100) thus constructs data packet (600) and transmits it (608) by vibrations on a power line (cable where device (426 ID: 101) is connected. This could be a direct cable (as shown), but could also be a "T" or "Y" cable or other type connector.

Device (426 ID: 101) receives the data packet, reads the To-local field (604), and determines that it is the proper local recipient of the data packet, but upon examining the To-ultimate field (602) determines that it is not the proper ultimate recipient of the data packet. Device (426 ID: 101) then consults its own routing table, determines that it is connected to the To-ultimate device, and repackages the data packet as (610). In this repackaged data packet, because the To-ultimate device appears to be the next device in the network, the To-local and To-ultimate fields refer to the same device, device ID: 110. device (426 ID: 101) then retransmits (612) the data packet.

In the last step (614), device (426 ID: 110) receives data packet (610). Upon inspection, the device sees that it is both the proper To-local recipient and the proper To-ultimate recipient. As a result, device (426 ID: 110) does not retransmit the data packet further, but rather extracts the payload data (606) and does whatever the payload data requests.

More complex data packet configurations and schemes, including schemes and configurations with "from device" fields, acknowledgment fields, error correcting fields, and other types of fields may be used. Indeed there is no reason why standard internet data packets and protocols cannot be used. However due to the relative simplicity of the solar array network, in some cases it may be useful to produce a more streamlined protocol intended to optimize the relatively low bandwidth of the vibration mediated network.

In general, a wide variety of different network and router protocols may be used. These can include mesh network protocols, and non-mesh protocols. Examples of various router protocols include the open Shortest Path First protocol (OSPF), the Routing Information Protocol (RIP), Distance-vector routing protocols, and other protocols. Unicast, broadcast, multicast, and anycast schemes may also be used. Static routing and dynamic routing methods may be used.

Many different types of data packets may also be used. These include schemes where the loss of duplication of packets can be detected, such as the well known TCP/IP protocol, and also simpler protocols as well.

Other network architectures, including peer-to-peer architecture, may also be employed. In general any network architecture, any packet configuration, and any routing scheme is within the scope of the invention.

It should be appreciated that vibration mediated data transmission may occasionally encounter situations, such as the edges of solar arrays, where the vibration conducting power cables or support structures are unusually long, thus making an unusually large gap between different nodes, and potentially degrading the vibration mediated signal to the point where it may become unreliable.

Figure 7:
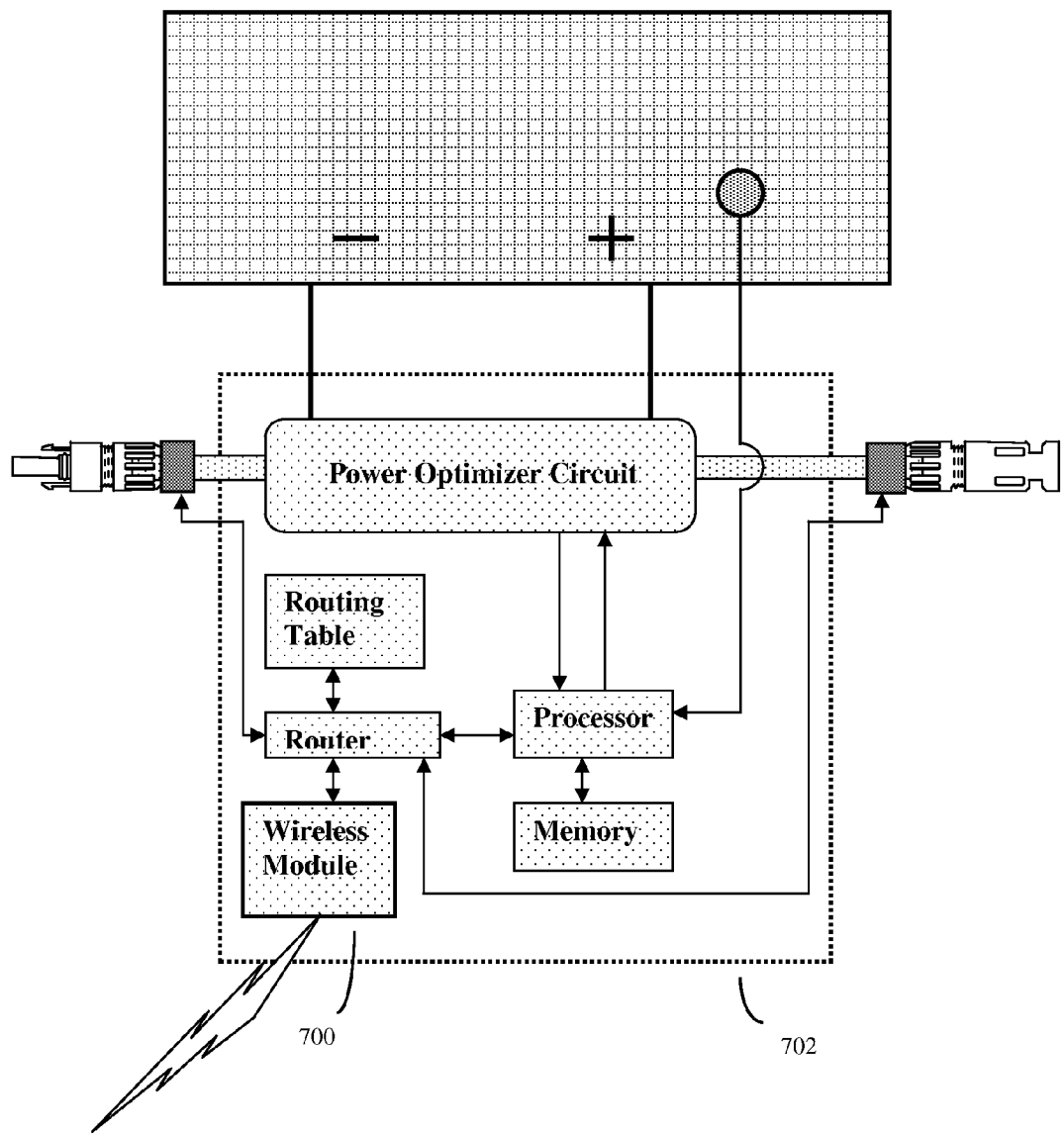
FIG. 7 shows a diagram of an alternate networked cell power optimization device that utilizes vibrations as the main communications modality, and which has the additional ability to fallback to an alternate communications modality (such as wireless communication) when the vibration mediated modality proves to be unreliable.

To address this problem, where certain nodes and devices (426) in the vibration mediated solar array network may be too distant from other nodes for the vibration signal to carry well, an alternate version of device (426) may be constructed, in which a fall-back communications modality, such as a wireless communications transceiver, a direct electrical wire connection, an optical cable connection), etc. may also be connected to the router. An embodiment of such a fall-back device is shown in FIG. 7. Here a wireless transceiver module (700) is shown, and the device (426) equipped with an alternate fallback method of communication is designated device (702), and the device will be referred to as a "fallback device". An example of such fallback devices in operation is shown in FIG. 8.

Figure 8:
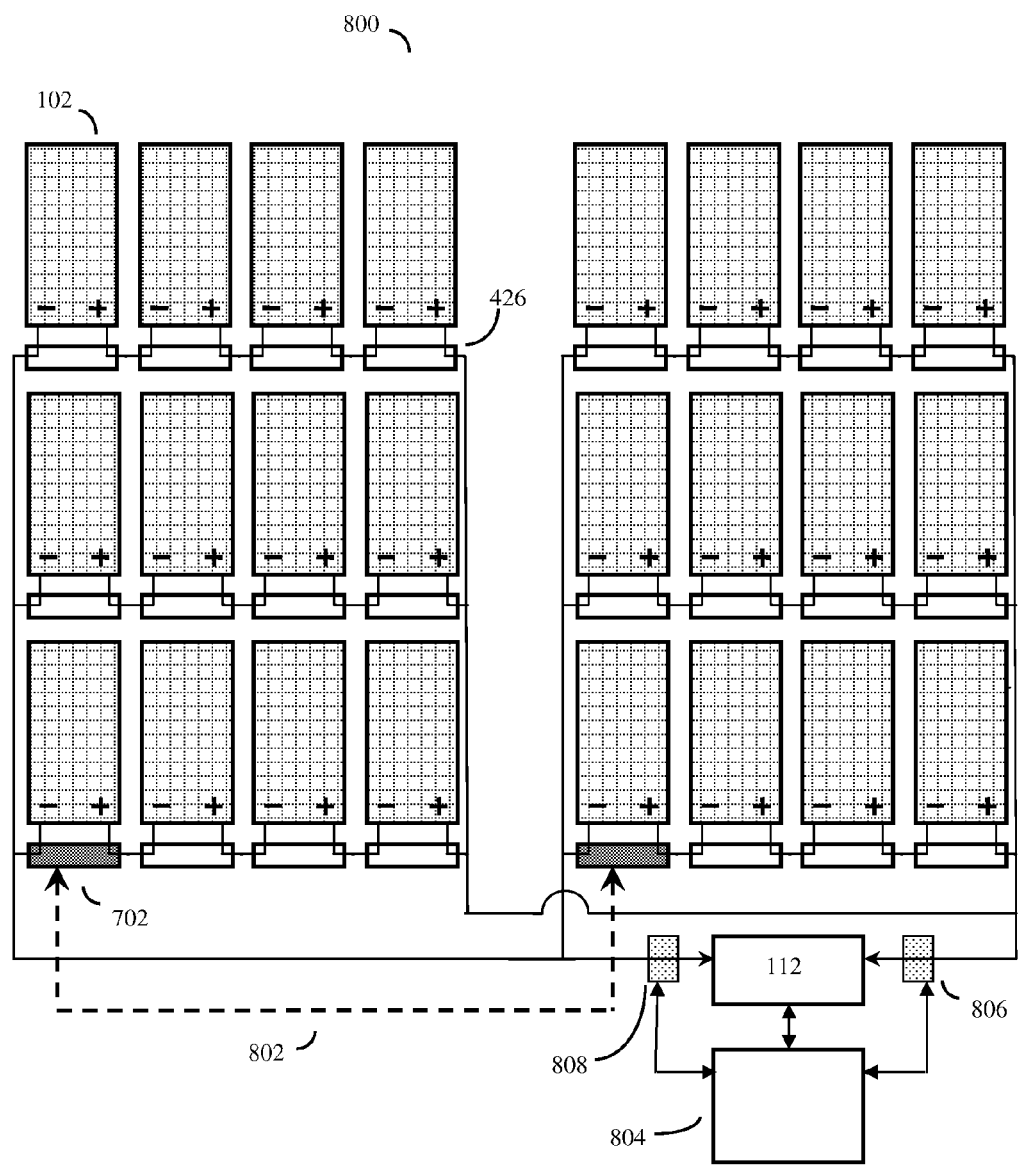
FIG. 8 shows a diagram of how a centralized controller may use the vibration mediated network to adjust various locally optimized power optimization devices to achieve a better power optimization for the solar array as a whole.

FIG. 8 shows another embodiment of the network of the invention (800). In this embodiment, each solar panel (102) is equipped with an intelligent networked device (426). Certain network nodes where the vibration signal must travel a long distance, and where data communications may thus be weaker, are supplemented by fallback equipped devices (702), and the alternate, fallback (non-vibration) data path is shown as (802).

In this embodiment, a centralized control device (804) periodically requests sensor data packets from devices (426), (702), usually using vibration transducers (806), (808) or supplemental fallback methods (802) as appropriate. The centralized control device then will usually compute the proper adjustments to determine the loads for each solar panel that would optimize the power output of the solar array (800) as a whole, and then send data packets to the individual devices (426), (702) commanding them to set the solar panel loads appropriately.

FIG. 9 shows a diagram of various alternate transducer configurations. Although the transducers may be in a ring or tube configuration, mounted over the power cables or other vibration conducting media, as previously shown in FIG. 4 (406), (408); and FIG. 8 (806), (808); other transducer configurations are also possible. For example, power wires often terminate onto a support surface, which may be a printed circuit board, power coupler, or other type of fixture. In FIG. 9 (900), the wire or cable (902) is mounted on a fixture (904) attached to a printed circuit board (906) or other surface. In this example, a transducer (908), such as a piezoelectric transducer, is firmly attached to the outer cylindrical surface of the wire (902) by a pressure screw (910) or other device. Here this screw (910) and fixture (904) are essentially applying a crimp to the wire (902) as well, thus firmly affixing the wire to the circuit board (906). Alternatively the transducer may be mounted on the cylindrical surface of wire (902) by an adhesive or other means.

In FIG. 9 (920), the transducer (922) is attached to the end of the wire (924) so that the transducer is configured to induce (or detect) bulk waves that travel along the interior of the wire.

It should be evident that although the bulk of the examples in this disclosure are focused on photovoltaic solar array applications, the invention herein has a broader applicability to many applications beyond solar array network communications. Examples of other applications include non-photovoltaic applications such as electricity poles and towers, communication using pipes, and other applications.

The invention claimed is:

1. A data communications device for a photovoltaic solar panel, comprising:
   at least one electrically driven vibration transducer capable of inducing vibrations in a solid media;
   at least one vibration receiver capable of detecting vibrations in a solid media and converting said vibrations into an electrical signal
   said electrically driven vibration transducer and said vibration receiver being components of an electrical circuit that is in electrical contact with said photovoltaic solar panel;
   said solid media being capable of transmitting said vibrations to an external vibration receiver, and receiving vibrations from an external vibration transmitter;
   wherein said vibrations are used to both transmit and receive data;
   wherein said data comprises data packets comprising at least an ultimate destination device identifier, a local destination device identifier and payload data;
   wherein said electrical circuit comprises a component electrically supplying a device identification number and a router;
   wherein said vibration receiver transmits a received data packet to said router;
   wherein if said local destination device identifier on said received data packet corresponds to said device identification number, said router then:
   A: examines said ultimate destination device identifier on said received data packet, and determines a second local destination device identifier suitable for transmitting said received data packet payload data to said ultimate destination device identifier;
   B: constructs a transmitted data packet consisting of at least said ultimate destination device identifier, and a second local destination device identifier, and said payload data;

C: and transmits said transmitted data packet to said electrically driven vibration transducer; thus transmitting the transmitted data packet by a vibration in said solid media.

2. A vibration mediated data communications device for a photovoltaic solar panel, comprising:
- at least one electrically driven vibration transducer capable of inducing vibrations in a solid media;
- at least one vibration receiver capable of detecting vibrations in a solid media and converting said vibrations into a received electrical signal;
- said solid media being capable of transmitting said vibrations to an external vibration receiver, and receiving vibrations from an external vibration transmitter;
- said electrically driven vibration transducer and said vibration receiver being components of an electrical circuit that is in electrical contact with said photovoltaic solar panel;
- wherein said electrical circuit additionally comprises:
  - A: a device identification number;
  - B: a router;
  - C: at last one processor in electrical communication with said electrically driven vibration transducer and said vibration receiver;
  - D: software stored in memory that is addressed by said at least one processor;
  - E: sensors capable of detecting at least the voltage level and the current level produced by said photovoltaic solar panel and relaying said voltage level and said current level to said at least one processor;
  - F: at least one processor-controlled power optimizer circuit capable of altering the voltage and current output by said photovoltaic solar panel upon command by said at least one processor;
- wherein said vibrations are used to both transmit and receive data packets comprising at least an ultimate destination device identifier, a local destination device identifier and payload data;
- wherein the device may package the voltage level and current level produced by said photovoltaic solar panel into a sensor payload data portion of a sensor data packet and transmit this sensor data packet to an ultimate destination device identifier by way of a local destination device identifier; or
- wherein the device may receive an adjustment data packet, and if said local destination device identifier and said ultimate destination identifier on said adjustment data packet corresponds to said device identification number, use the said adjustment data packet payload on said received adjustment data packet to direct said processor-controlled power optimizer circuit to adjust the current and voltage output of said photovoltaic solar panel; or
- wherein the device may receive a data packet intended for a different destination (routed data packet), and if said local destination device identifier on said routed data packet corresponds to said device identification number, and said ultimate destination device identifier on said routed data packet does not correspond to said device identification number, then the device will route said routed data packet to a second local destination device identifier suitable for transmitting said routed data packet payload data to the ultimate destination device identifier on said routed data packet.

3. The device of claim 2, further comprising a temperature sensor, and in which temperature sensor data is transmitted in said sensor data payload portion of said sensor packet.

4. The device of claim 2, in which the data packets further comprise at least one local source identifier field and an acknowledgment field, wherein when the device transmits a data packet to another local device (second device), the device software expects to receive an acknowledgment data packet from the second device with second device's identification number in the local source identifier field, and if such acknowledgment is not received, the device will attempt to route the transmitted data packet to an alternate local device (third local device).

5. The device of claim 2, in which the device further comprises alternate data transmitting and receiving devices selected from the group consisting of radiofrequency (wireless) transmitters and radiofrequency (wireless) receivers, direct wire communication lines, and optical fiber communications lines;
- wherein if the device's location in the local network topology is unfavorable for transmitting or receiving data to and from another local device by said vibration of said sold media, the device will instead transmit data packets or receive data packets by said alternate data transmitting and receiving devices.

6. A data communications device for a photovoltaic solar panel, comprising:
- at least one electrically driven vibration transducer capable of inducing vibrations in a solid media;
- at least one vibration receiver capable of detecting vibrations in a solid media and converting said vibrations into an electrical signal
- said electrically driven vibration transducer and said vibration receiver being components of an electrical circuit that is in electrical contact with said photovoltaic solar panel;
- said solid media being capable of transmitting said vibrations to an external vibration receiver, and receiving vibrations from an external vibration transmitter;
- wherein said vibrations are used to both transmit and receive data;
- wherein said data comprises data packets comprising at least an ultimate destination device identifier, a local destination device identifier and payload data;
- wherein said electrical circuit additionally comprises:
  - A: a device identification number;
  - B: a router;
  - C: at last one processor in electrical communication with said electrically driven vibration transducer and said vibration receiver;
  - D: software stored in memory that is addressed by said at least one processor;
  - E: sensors capable of detecting at least the voltage level and the current level produced by said photovoltaic solar panel, and relaying said voltage level and said current level to said at least one processor;
- wherein said processor and said software encode said voltage level and said current level into the payload data of a data packet, creating sensor payload data;
- and wherein said router constructs a transmitted data packet consisting of at least said ultimate destination device identifier, a second local destination identifier, and said sensor payload data;
- wherein said router and transmits said transmitted data packet to said electrically driven vibration transducer, thus transmitting the transmitted data packet by a vibration in said solid media.

7. A data communications device for a photovoltaic solar panel, comprising:

at least one electrically driven vibration transducer capable of inducing vibrations in a solid media;

at least one vibration receiver capable of detecting vibrations in a solid media and converting said vibrations into an electrical signal said electrically driven vibration transducer and said vibration receiver being components of an electrical circuit that is in electrical contact with said photovoltaic solar panel;

said solid media being capable of transmitting said vibrations to an external vibration receiver, and receiving vibrations from an external vibration transmitter;

wherein said vibrations are used to both transmit and receive data;

wherein said data comprises data packets comprising at least an ultimate destination device identifier, a local destination device identifier and payload data;

wherein said electrical circuit additionally comprises:

A: a device identification number;

B: a router;

C: at last one processor in electrical communication with said electrically driven vibration transducer and said vibration receiver;

D: software stored in memory that is addressed by said at least one processor;

E: at least one processor-controlled power optimizer circuit capable of altering the voltage and current output by said photovoltaic solar panel upon command by said at least one processor;

wherein said vibration receiver transmits a received adjustment data packet to said router;

wherein if said local destination identifier on said received adjustment data packet corresponds to said device identification number, said router then examines the payload data (adjustment payload data) from said adjustment data packet, and communicates this adjustment payload data to said at least one processor;

and said at least processor interprets said adjustment payload data and sends a command to said at least one power optimizer circuit alter the voltage and current output of said photovoltaic solar panel.

\* \* \* \* \*